(12) United States Patent
Kwok et al.

(10) Patent No.: US 12,541,649 B2
(45) Date of Patent: Feb. 3, 2026

(54) SYSTEM AND METHOD FOR INCORPORATING RISK RELATED TOPICS INTO CHATBOT FUNCTIONALITY

(71) Applicant: Capital One Services, LLC, McLean, VA (US)

(72) Inventors: Jennifer Kwok, Brooklyn, NY (US); Casey Han, New York, NY (US); Daniel E. Miller, Brooklyn, NY (US); Dan Lin, Arlington, VA (US); Esther Uhri Cho, Hoboken, NJ (US); Alexander Mireles, Clifton, VA (US); Phoebe Atkins, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 252 days.

(21) Appl. No.: 18/199,480

(22) Filed: May 19, 2023

(65) Prior Publication Data
US 2024/0111961 A1    Apr. 4, 2024

Related U.S. Application Data

(60) Provisional application No. 63/412,192, filed on Sep. 30, 2022.

(51) Int. Cl.
*G06F 40/35* (2020.01)
*G06F 3/0481* (2022.01)
*G06F 3/04842* (2022.01)
*G06Q 10/0635* (2023.01)
*H04L 51/02* (2022.01)

(52) U.S. Cl.
CPC ............ *G06F 40/35* (2020.01); *G06F 3/0481* (2013.01); *G06F 3/04842* (2013.01); *G06Q 10/0635* (2013.01); *H04L 51/02* (2013.01)

(58) Field of Classification Search
None
See application file for complete search history.

(56) References Cited

U.S. PATENT DOCUMENTS

| | | |
|---|---|---|
| 10,769,570 B2 | 9/2020 | Lu |
| 2020/0202268 A1 | 6/2020 | Retna et al. |
| 2020/0265356 A1 | 8/2020 | Lee et al. |
| 2021/0249002 A1 | 8/2021 | Ahmadidaneshashtiani et al. |
| 2023/0000448 A1* | 1/2023 | McClure .............. A61B 5/7465 |

\* cited by examiner

*Primary Examiner* — Antim G Shah
(74) *Attorney, Agent, or Firm* — Sterne, Kessler, Goldstein & Fox P.L.L.C.

(57) ABSTRACT

A system and method employs a chatbot into which a user can input an inquiry/question regarding a risk related topic is disclosed. The user can obtain an answer to the inquiry. The system and method can receive, via a chatbot interface, an inquiry. An intent of the inquiry can be determined using a natural language processing (NLP) model. The inquiry can be matched, using a classifier, to a related data set based on the determined intent. An output can be generated based on the related data set in response to the inquiry. The output can be transmitted for display on the chatbot interface.

20 Claims, 9 Drawing Sheets

SYSTEM AND METHOD FOR INCORPORATING RISK RELATED TOPICS INTO CHATBOT FUNCTIONALITY

CROSS REFERENCE TO RELATED APPLICATIONS

This application is claims priority to U.S. Provisional Application No. 63/412,192, filed on Sep. 30, 2022, the contents of which are incorporated by reference herein in their entirety.

TECHNICAL FIELD

Aspects relate to a system that uses chatbots and natural language processing (NLP) to generate answers for questions/inquiries to risk related topics.

BACKGROUND

Companies must often comply with various laws, regulatory rules, internal policies, etc. in order to operate within the law, according to industry norms, or according to business goals/objectives. For example, public companies must comply with Securities and Exchange Commission (SEC) rules and regulations regarding their financial reporting and disclosures. Another example is companies that deal with individual's personal data. These companies can have a myriad of laws and regulations to comply with, including the General Data Protection Regulation (GDPR) of the European Union, or the California Consumer Privacy Act (CCPA), in order to protect individual's personal identifying information (PII). Companies may also have internal guidelines/policies or contractual obligations that must be complied with. If companies fail to comply with these laws, regulatory rules, or internal policies, they can run the risk of fines, lawsuits, or investigations levied against them. They can also fail to meet business objectives and goals. This can be detrimental to a company's reputation, finances, and overall business. Thus, it is in the interest of company personnel to always know whether the company is in compliance with laws, regulatory rules, internal policies, or contractual obligations, etc., and be alerted of any non-compliance.

In order to know whether a company is in compliance with the various laws, regulatory rules, internal policies, etc., company personnel must be informed of the various rules, regulations, contractual obligations, etc. that govern the rules for compliance. Often, however, company personnel are not aware of every rule, regulation, or obligation because these are often contained in contracts, regulatory notices, statutes, etc. that company personnel has not read or is unaware of. Finding and reading these documents is also time consuming. It would be ideal if company personnel can be informed of such obligations automatically and without having to parse through the various documents necessary to determine compliance. Thus, computer implemented and automated systems and methods are needed to better inform company personnel of whether the company is in compliance with laws, regulatory rules, internal policies, contractual obligations, etc.

SUMMARY

In aspects, the system can perform its functions by receiving, via a chatbot interface, an inquiry. Using an NLP model, the inquiry's intent can be determined. Based on determining the intent, the system can match, using a classifier, the inquiry to a related data set for a particular topic the inquiry relates to. The system can generate an output based on the related data set in response to the inquiry. The system can transmit the output for display on the chatbot interface.

In aspects, the output can be generated in real-time from when the inquiry is received. Real-time refers to the output being generated within seconds or milliseconds of when the inquiry is received from the chatbot interface. In aspects, the system can generate a follow up question based on the output. In aspects, the system can generate an interactive button with an answer option for the follow up question, and transmit the interactive button to the chatbot interface for display. In aspects, the system can receive a follow up answer to the follow up question based on a user interacting with the interactive button. In aspects, a further follow up question can be generated based on the follow up answer. In aspects, a further interactive button can be generated with a further answer option for the further follow up question, and transmitted to the chatbot interface for display. In this way, the system can use a question-answer format to drill down to the specific issue the user would like addressed, and thus generate a correct answer to the user's question/inquiry.

In aspects, the system can also use other indicators along with the NLP model to determine the intent of the user's inquiry. For example, the other indicators can be determined based on analyzing: a webpage a user is viewing while making the inquiry, a workflow the user is using while making the inquiry, a software program the user is using while making the inquiry, or data associated with the user making the inquiry.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

In the drawings, like reference numbers generally indicate identical or similar elements. Additionally, generally, the left-most digit(s) of a reference number identifies the drawing in which the reference number first appears.

DETAILED DESCRIPTION

Aspects of this disclosure are directed to systems and methods that employ a chatbot into which a user can input an inquiry/question regarding a risk related topic and obtain an answer to the inquiry. The chatbot can have an interface into which the user can input the inquiry/question. In aspects, the interface can be a textbox or text window into which the user can type in the inquiry. While applicable to a variety of chatbot uses, aspects of the disclosure will be described with reference to corporate compliance efforts as an explanatory example. In such an example, the risk related topic can be a topic related to whether a company is in compliance with a law, regulatory rule, internal policy, contractual obligation, etc. In aspects, the chatbot can be integrated into a software application or web-browser. The software application can be an application that is related to monitoring or tracking compliance issues. For example, the software application can be part of software built to perform auditing. If integrated into a web-browser (e.g., as an applet or plugin), the chatbot can connect to a compliance monitoring system/software, which can cause the chatbot to activate if the compliance monitoring system/software detects any compliance related issues.

In aspects, the chatbot interface can be activated and prompted to pop-up based on relevance to a user action. For example, if the chatbot is integrated into a software application that monitors risk or compliance issues for a particular topic or area (e.g., financial auditing software), and if the software application determines there is an issue related to compliance, it can present a button or icon to the user. User interaction with the button or icon can prompt the chatbot interface to pop-up and allow the user to make an inquiry related to the compliance issue. In aspects, if the chatbot is integrated into a web-browser as a plugin or applet, the plugin or applet can connect/integrate with a compliance monitoring system and/or software, and the chatbot can automatically pop-up if it determines there is an issue related to compliance to alert a user of the issue.

In aspects, and as indicated, the chatbot interface can be used to receive an inquiry from a user, related to a compliance/non-compliance issue. In aspects, once the inquiry is received, the system can use NLP techniques to allow a computer to recognize the intent of the inquiry. In other words, the NLP techniques allow the computer to understand what topics the user would like addressed. Based on recognizing the intent, the computer can classify/match the inquiry to a source of data, such as a document, a database, etc. that contains information related to the topic of the inquiry. By matching the inquiry to the data sources, the system can generate an answer to the inquiry based on information contained in the data source. In aspects, the system can use a question-answer format, in which a series of follow up questions can be generated based on the inquiry, each to drill down to the specific issue the user wants addressed. Once the specific issue is determined, the system can generate an answer/solution to the inquiry. In this way, the system can enhance its ability to generate a correct answer to the user's question/inquiry.

The system provides benefits in that it allows users to ask questions/make inquiries regarding risk and compliance related topics and have those questions answered without the user having to parse through legal, regulatory, or policy documents. Thus, the system provides a way for computers to use NLP techniques to efficiently match the intent of a user's question to risk related topics, and to generate answers to those questions. This saves users' time by not having to read and parse through documents to find the answer for him or herself. The system can also provide answers to user questions in real-time thus alerting users to any non-compliance issues immediately and allowing users to address those issues. This is a benefit to companies because it allows companies to address any non-compliance issues early on, thus avoiding any delay and potential damage to the company's business or reputation resulting from the non-compliance.

The following aspects are described in sufficient detail to enable those skilled in the art to make and use the disclosure. It is to be understood that other aspects are evident based on the present disclosure, and that system, process, or mechanical changes may be made without departing from the scope of aspects of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

Figure 1:
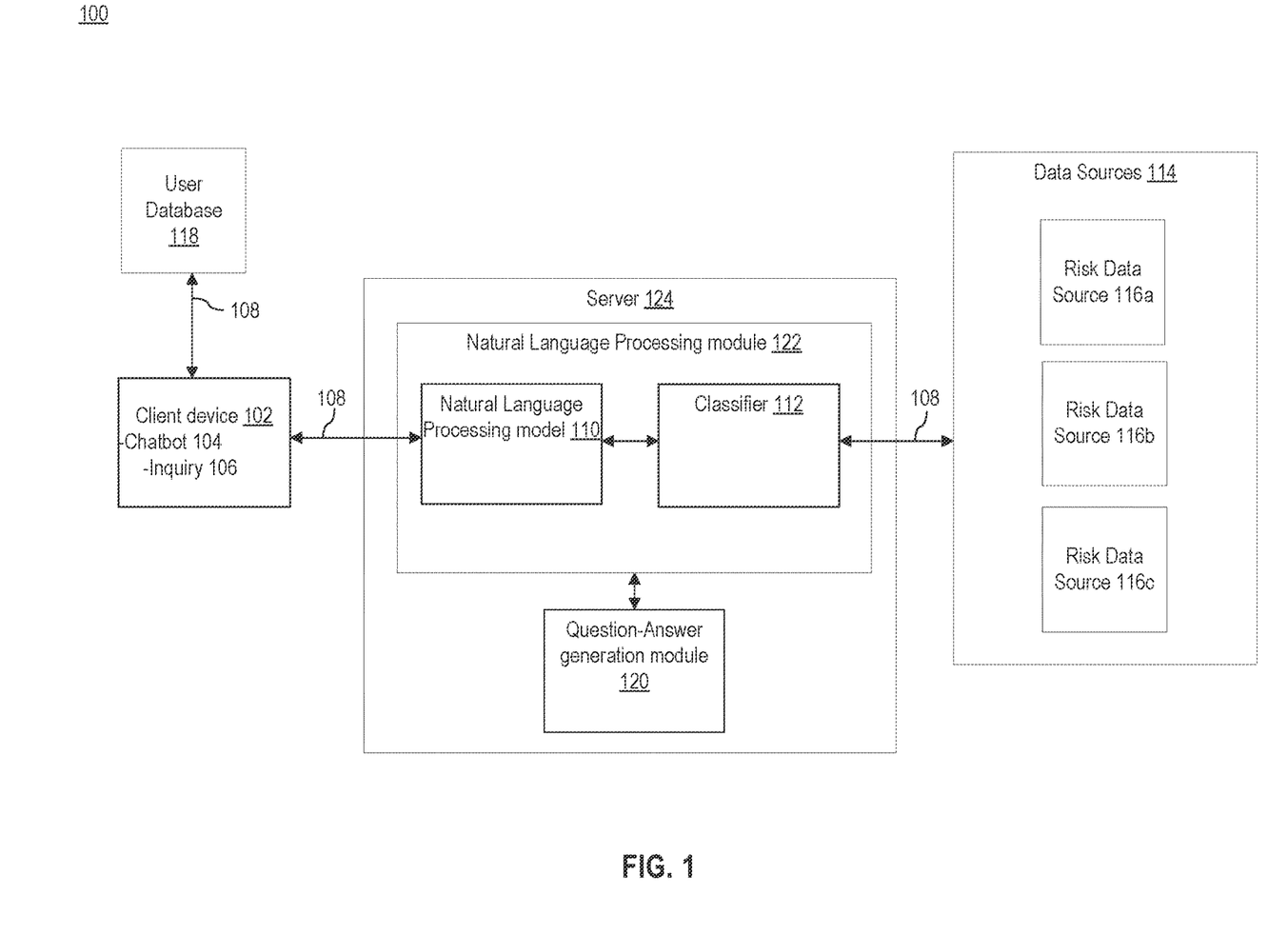
FIG. 1 is an example architecture of a system that employs a chatbot into which a user can input an inquiry regarding a risk related topic and obtain an answer/output based on the inquiry, according to aspects of the disclosure.

FIG. 1 is an example architecture of a system 100 that employs a chatbot 104 into which a user can input an inquiry 106 regarding a risk related topic and obtain an answer/output based on the inquiry 106, according to aspects of the disclosure. In aspects, the system 100 is associated with a particular company, and the user can be any company personnel. The user can be, for example, a manager, compliance officer, or other employee or contractor that is either in charge of making sure the company is complying with certain policies, regulations, contracts, etc., or that needs to know whether the company is complying with the same.

In aspects, the system 100 can employ natural language processing (NLP) techniques to determine the intent of the inquiry 106. Once the intent is determined, the system 100 can use a classifier 112 to match the inquiry 106 to related data sets. Related data sets refer to data or information related to the risk related topics. The related data sets can be obtained from data sources 114. The data sources 114 refer to documents, databases, repositories, etc. that are related to risk related topics. For example, these data sources 114 can be policy documents, compliance documents, compiled rules and regulations, legal contracts, metrics indicating compliance or non-compliance (e.g., those obtained from customer relationship management (CRM) software such as that provided by SalesForce™), etc. The data sources 114 are shown in FIG. 1 as risk data sources {116a, 116b, 116c}, which can each represent a different data source (e.g., a document, database, etc.). How the NLP techniques are used to determine the intent and how the classifier 112 performs the matching will be discussed further below.

In aspects, based on the determined intent, an answer/output can be generated in response to the inquiry 106. In aspects, the NLP techniques may be performed by a NLP module 122 implemented on a server 124. In aspects, the NLP module 122 can implement an NLP model 110 and the classifier 112 to perform the NLP techniques and matching functions.

In aspects, the server 124 may be a variety of centralized or decentralized computing devices. For example, the server 124 may be a mobile device, a laptop computer, a desktop computer, grid-computing resources, a virtualized computing resource, cloud computing resources, peer-to-peer distributed computing devices, a server farm, or a combination thereof. The server 124 may be centralized in a single room, distributed across different rooms, distributed across different geographic locations, or embedded within a network 108. The server 124 can couple with the network 108 to communicate with other devices, such as a client device 102, on which the chatbot 104 can be implemented. The client device 102 may be any of a variety of devices, such as a smart phone, a cellular phone, a personal digital assistant, a tablet computer, a notebook computer, a laptop computer, a desktop computer, or a combination thereof. The server 124 and the client device 102 may be stand-alone devices and work independently from one another.

The network 108 refers to a telecommunications network, such as a wired or wireless network. The network 108 can span and represent a variety of networks and network topologies. For example, the network 108 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 can traverse a number of topologies and distances. For example, the network 108 can include a direct connection, personal area network (PAN), local area network (LAN), metropolitan area network (MAN), wide area network (WAN), or a combination thereof.

In aspects, and as indicated, the system 100 can receive the inquiry 106 via the chatbot 104. The inquiry 106 can be a typed command or question comprising text into a text box of the chatbot 104. In aspects, the chatbot 104 can be integrated into a software application or browser of the client device 102, and provide an interface which the user can use to input the inquiry 106. The interface refers to a graphical user interface (GUI), which the user can use to input the inquiry 106. Example interfaces will be described with respect to FIGS. 2-7 below. In aspects, the software application with which the chatbot 104 can be integrated can be an application that is related to monitoring or tracking compliance issues. For example, the software application can be part of software built to perform auditing. In the case where the chatbot 104 is installed on a browser, the chatbot 104 can be integrated with a software related to monitoring or tracking compliance issues or similar auditing software.

In aspects, the chatbot's 104 interface can be prompted to pop-up based on a user action and/or if the software with which the chatbot 104 is integrated determines there is an issue regarding compliance/non-compliance. For example, if the chatbot is integrated into a software application that monitors risk or compliance issues for a particular topic or area (e.g., financial auditing software), if the software application determines there is an issue related to compliance (e.g., certain required compliance metrics are not being met, an audit rule has failed, etc.), the software application can present a button or icon that when a user interacts with, can prompt the chatbot 104 to pop-up, and allow the user to make an inquiry into the compliance related issue. In aspects, if the chatbot 104 is integrated into a web-browser as a plugin or applet, the plugin or applet can integrate with a compliance monitoring system and/or software application, and can automatically have the chatbot 104 pop-up if the compliance monitoring system and/or software determines there is a compliance related issue, in order to alert a user.

In aspects, if the software determines that there is a compliance related issue, it can generate a prompt to the user, alerting the user of the issue. The prompt can be displayed via the chatbot's 104 interface. For example, if a certain audit rule has failed, the software can generate a prompt indicating that the audit rule has failed, and ask the user whether the user would like to take further action to address the issue. In aspects, the user's answer/response to the prompt can form the inquiry 106.

In aspects, once the inquiry 106 is received, the inquiry 106 and control can be passed to the NLP model 110 of the NLP module 122. The NLP model 110 can enable the system 100 to determine the intent of the inquiry 106. In aspects, this can be done by having the NLP model 110 implement NLP techniques to analyze the words of the inquiry 106 to determine what action the user wants the system 100 to take. For example, the user can type into the chatbot 104 that the user wants more information about the issue or that the user wants a certain metric returned so that he or she can investigate the issue further.

In aspects, the NLP model 110 can determine the intent of the inquiry 106 by extracting the words of the inquiry 106 and using trained machine learning models such as the Bidirectional Encoder Representations from Transformers (BERT) developed by Google™ or the Robustly Optimized BERT approach (RoBERTa) developed by Facebook™ to determine the context of the words. A person of skill in the art (PO SA) will recognize how to implement machine learning models such as BERT or RoBERTa to extract meaning and intent from the inquiry 106 given this disclosure. In aspects, other machine learning tools can be used, such as syntactic maps, etc. to determine relationships between words of the inquiry 106 and to assist in determining the intent. In aspects, the machine learning models can be trained based on a corpus of data and can have keywords, sentence combinations, question types, etc. labeled such that they map to certain topics, data sources 114, and/or concepts. These labels can be used when determining the intent of the inquiry 106. For example, if certain keywords appear in the inquiry 106, the NLP model 110 can determine that the inquiry 106 is related to a particular topic and match the inquiry 106 to a particular label related to that topic.

In aspects, once the inquiry is matched to a label, control can be passed to a classifier 112 which can classify/map the inquiry 106 to a related data set based on the label. In aspects, the related data set is a collection of documents or other data represented by data sources 114. In aspects, the classification/mapping can be done based on having the labels matched to particular data sources 114. The labels can be matched to particular data sources 114 in advance, and if a particular inquiry 106 is matched to a particular label, that inquiry 106 can also be matched to the data sources 114 associated with that label.

In aspects, in order to determine the intent of the inquiry 106, the chatbot 104 and/or the NLP module 122 can also analyze other indicators. These indicators can include: a webpage a user is viewing while making the inquiry 106, a workflow the user is using while making the inquiry 106, a software program the user is using while making the inquiry 106, or data associated with the user making the inquiry 106. For example, if the chatbot 104 is integrated with a particular software application (e.g., one related to financial auditing), the chatbot 104 can pass that information to the NLP module 122, which can have rules that can take that information into consideration when determining the intent of the inquiry 106. For example, based on being integrated with a particular type of software application (e.g., financial auditing software), the NLP module 122 can limit any data sources 114 to those associated with the topic area of the software application (e.g., financial data sources).

In aspects, a particular workflow of a software application with which the chatbot 104 is integrated can be analyzed when determining the intent of the inquiry 106. For example, if the user is on a particular screen of a software application related to a particular aspect of compliance (e.g., SEC rules regarding 10-K disclosure requirements), and the software determines there is an issue related to a 10-K disclosure, the NLP module 122 can take that information into consideration and limit any data sources 114 to those associated with that particular screen/topic.

In aspects, if the chatbot 104 is integrated with a web-browser, the chatbot 104 can monitor and determine what webpage the user is viewing to determine the intent of the inquiry 106. For example, if the chatbot 104 is integrated with a web-browser and is further integrated with a compliance monitoring software that is web based (e.g. SaaS based software), the chatbot 104 can analyze a uniform resource locator (URL) and determine what webpage is being viewed. The webpage can be pre-categorized and mapped to a particular topic, which can be used to determine the intent.

In aspects, the chatbot 104 can also analyze data associated with the user making the inquiry to determine the intent. For example, the chatbot 104 can determine a user identity based on a sign-in information of an account or session on a client device 102, the software with which the chatbot 104 is integrated, etc. Based on the same, the chatbot 104 can access a user database 118 containing user information for the identified user to retrieve user information about the user. The user information can be any information about the user's title, department, employee/contractor status, etc. that would typically be found in a company employee database. Based on the user information, the chatbot 104 can determine that the user works in a particular department, or works in a particular area, and can pass that information to the NLP module 122 to take into account when determining the intent of the inquiry 106, so as to limit any data sources 114 to those associated with the particular user's department, team, projects, etc.

In aspects, once the chatbot 104 determines the intent of the inquiry 106, control can be passed to the classifier 112 to map the inquiry 106 to a related data set based on the determined intent. In aspects, the mapping can be done based on predetermined labels mapping intent categories to data sources 114. For example, if the NLP model 110 determines that the intent of the inquiry 106 is to return a metric from a particular financial document, the classifier can map the inquiry 106 to the particular financial document so that an output can be generated returning the metric from the particular financial document.

In aspects, once the classification/mapping is performed by the classifier 112, control can pass to a question-answer generation module 120. The question-answer generation module 120 can generate an output for the inquiry 106 based on the data sources 114 the inquiry 106 was mapped to. In aspects, the question-answer generation module 120 can generate the output in a variety of ways. For example, in aspects, the question-answer generation module 120 can parse the data sources 114 and perform a keyword matching, to extract data it believes can provide an answer to the inquiry 106. For example, if the inquiry 106 requests that a certain metric be returned to the user, the question-answer generation module 120 can parse the data sources 116 and perform a keyword search for that metric. The question-answer generation module 120 can then return the metric to the chatbot 104 for display on the chatbot's 104 interface via a prompt.

In aspects, the question-answer generation module 120 can use a question-answer format to generate a follow up question and answer based on the inquiry 106 to drill down to the specific issue the user wants addressed. For example, and taking the example where the software determines there is a compliance issue and generates an initial prompt alerting the user of the issue, the user can input an inquiry 106 indicating that he or she wants more information related to the issue. After it is determined that the intent of the user is to get more information related to the issue, and data sources 114 are mapped to the inquiry 106, the question-answer generation module 120 can generate an output acknowledging the user's request, and generate a follow up question. For example, the acknowledgement can generate a prompt answering the user's initial request and give further information regarding what particular rule has failed, what metrics are failing, who to contact to take further action to resolve the issue or to alert about the compliance/non-compliance issue, etc. In aspects, the question-answer module 120 can also generate a further question asking what further action the user wants to take. For example, this can be whether the user wants to take further action, wants to contact an individual regarding the issue, wants a particular piece of information related to the issue, etc.

In aspects, the question-answer generation module 120 can generate an interactive button with an answer option for the follow up questions generated. In aspects, the interactive button can take the form of a radio button or icon that the user can interact with, by for example pressing the button or choosing a radio button option. Based on the choice made, further information can be given to the user. For example, and continuing with the example where the software finds a compliance issue and the user wants more information regarding the issue, the user can be given the additional information requested, and also further options regarding what to do next. In aspects, the further options can be given to the user in the form of a question with interactive buttons indicating "yes" or "no" options that the user can choose to take further action. For example, if the further option is to contact an individual to resolve the issue, the interactive buttons can present a "yes" or "no" option that the user can choose to contact the individual. In aspects, the further options can be given in the form of option choices with a predefined set of options to choose from. For example, these can be options to retrieve a particular metric, contact an individual, generate an email informing other individuals of the compliance issue, etc. In aspects, these options can be presented in the form of interactive buttons that the user can choose. In this way, a user can transmit a follow up answer to the follow up question based on the user interacting with the interactive button.

Alternatively or in conjunction, the follow up questions can present an option to the user to type in the request similar to how the inquiry 106 was input into the chatbot 104. In the case where the user types in a follow up answer the NLP model and classifier 112 can be used, similar to what was described before to determine the intent of the follow up answer and to map that answer to data sources 114 from which an output answering the follow up answer can be generated and transmitted to the user. In aspects, the process of repeatedly generating follow up questions, further follow up questions, follow up answers, and further follow up answers can be performed until a termination event is encountered or until the user receives a satisfactory answer to the inquiry 106. Such a termination event can include the user indicating that no further information is needed, the chatbot's 104 interface being closed, or a timeout event occurring in which the chatbot 104 doesn't receive a response after a period of time. In aspects, the system 100 can work in real-time. Real-time refers to the output being generated by the system 100 within seconds or milliseconds of when the inquiry 106 is received from the chatbot's 104 interface.

Figure 2:
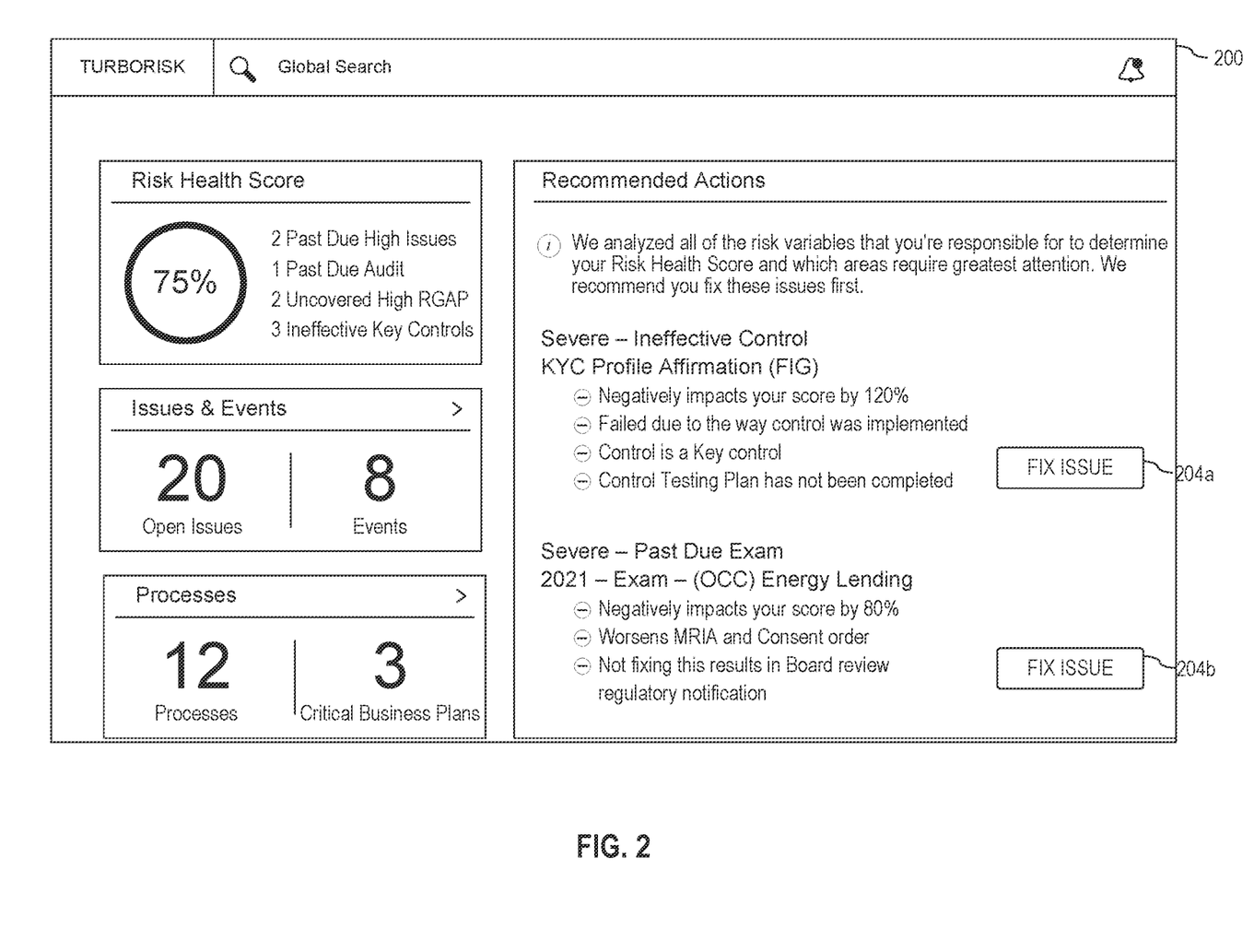
FIGS. 2-7 show example interfaces of a software application integrating the chatbot to receive the inquiry and generate an answer to the inquiry, according to aspects of the disclosure.

FIGS. 2-7 show example interfaces of a software application integrating the chatbot 104 to receive the inquiry 106 and generate an answer/output to the inquiry 106, according to aspects of the disclosure. FIG. 2 shows a GUI 200 for a software application integrating the chatbot 104. The GUI 200 shows a screen where the software application has determined that there are compliance issues that need to be fixed or addressed. In aspects, the GUI 200 can present icons or buttons 204 that when the user interacts with by, for example, pressing, can initiate the chatbot 104 to pop-up or launch.

Figure 3:
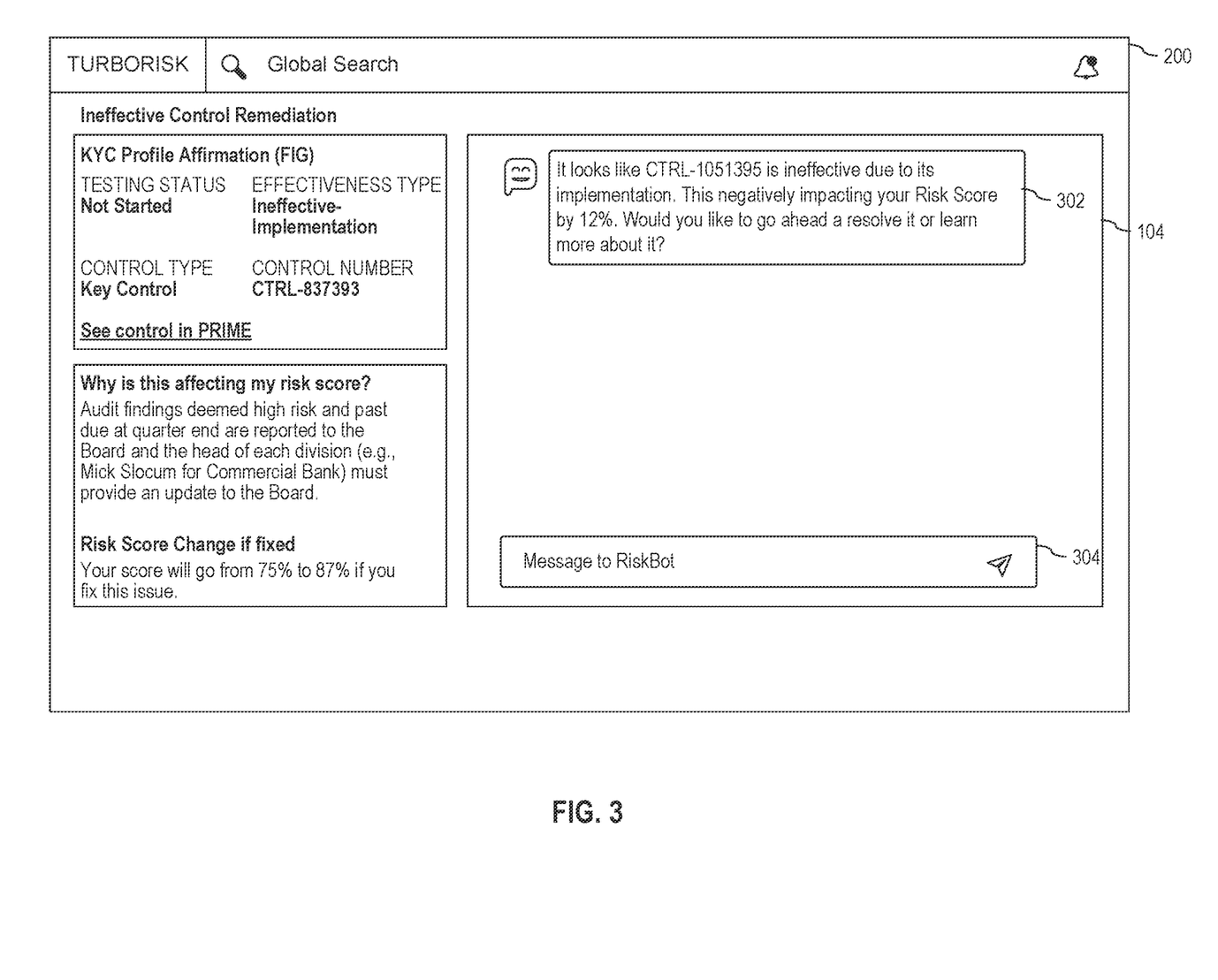
Figure 4:
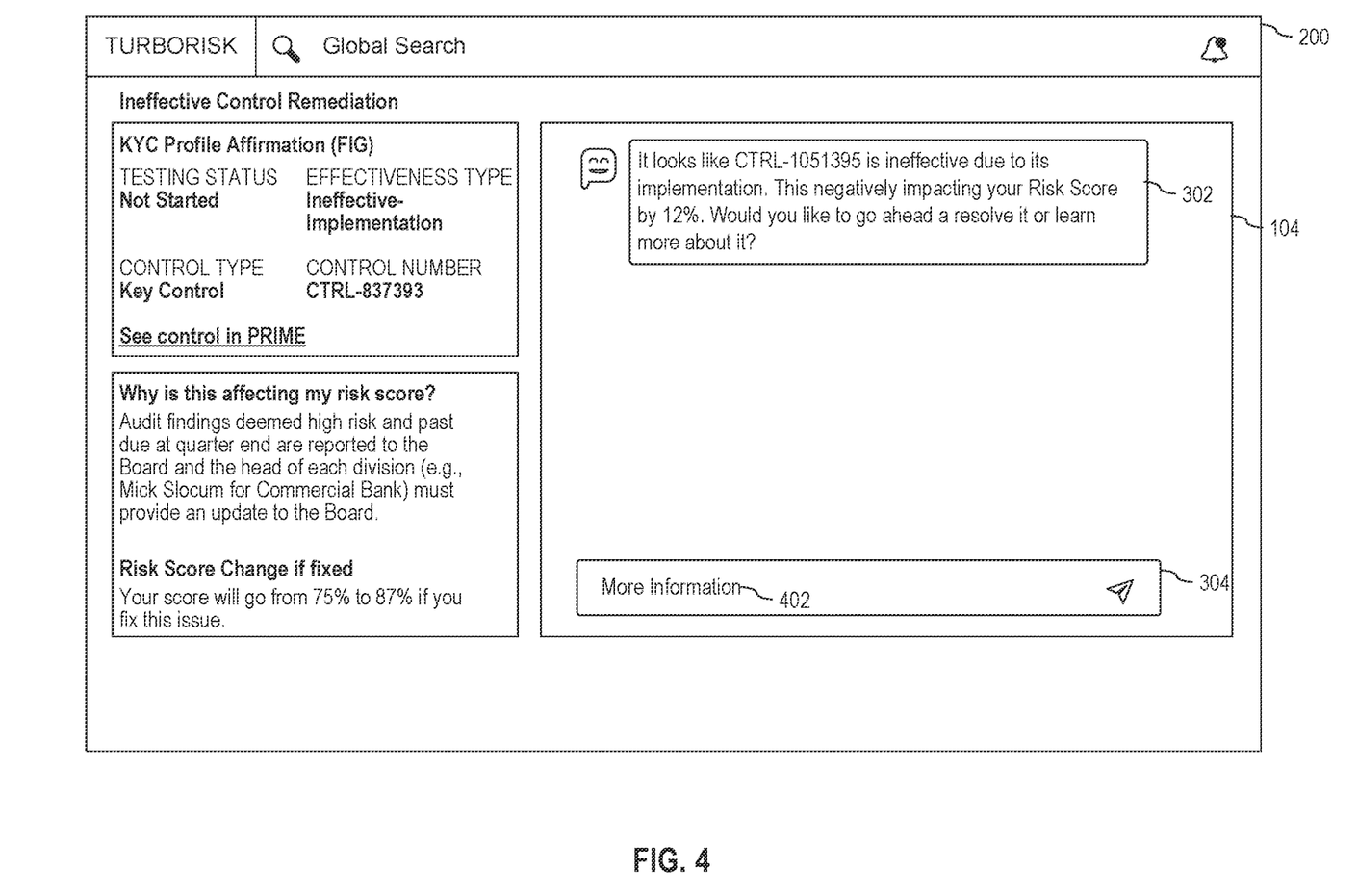

In FIG. 2, the icons or buttons are shown as 204a and 204b indicating that two compliance/non-compliance issues have been identified. FIG. 3 shows the chatbot's 104 interface after it is launched in response to the user interacting with an icon or button 204a or 204b, according to aspects. FIG. 3 shows a prompt 302 generated by the software application and displayed on the chatbot's 104 interface with further information regarding the compliance issues. In FIG. 3, the prompt indicates that a particular control is ineffective due to its implementation and indicates the impact of not addressing the issue. In aspects, in response to the prompt 302 a user can type the inquiry 106 into the text box 304. The inquiry 106 can be a command or text responding to the prompt 302. FIG. 4 shows the user's typed inquiry 402 into the text box 304. In FIG. 4, the typed inquiry 402 indicates that the user would like "more information" about the ineffective control.

Figure 5:
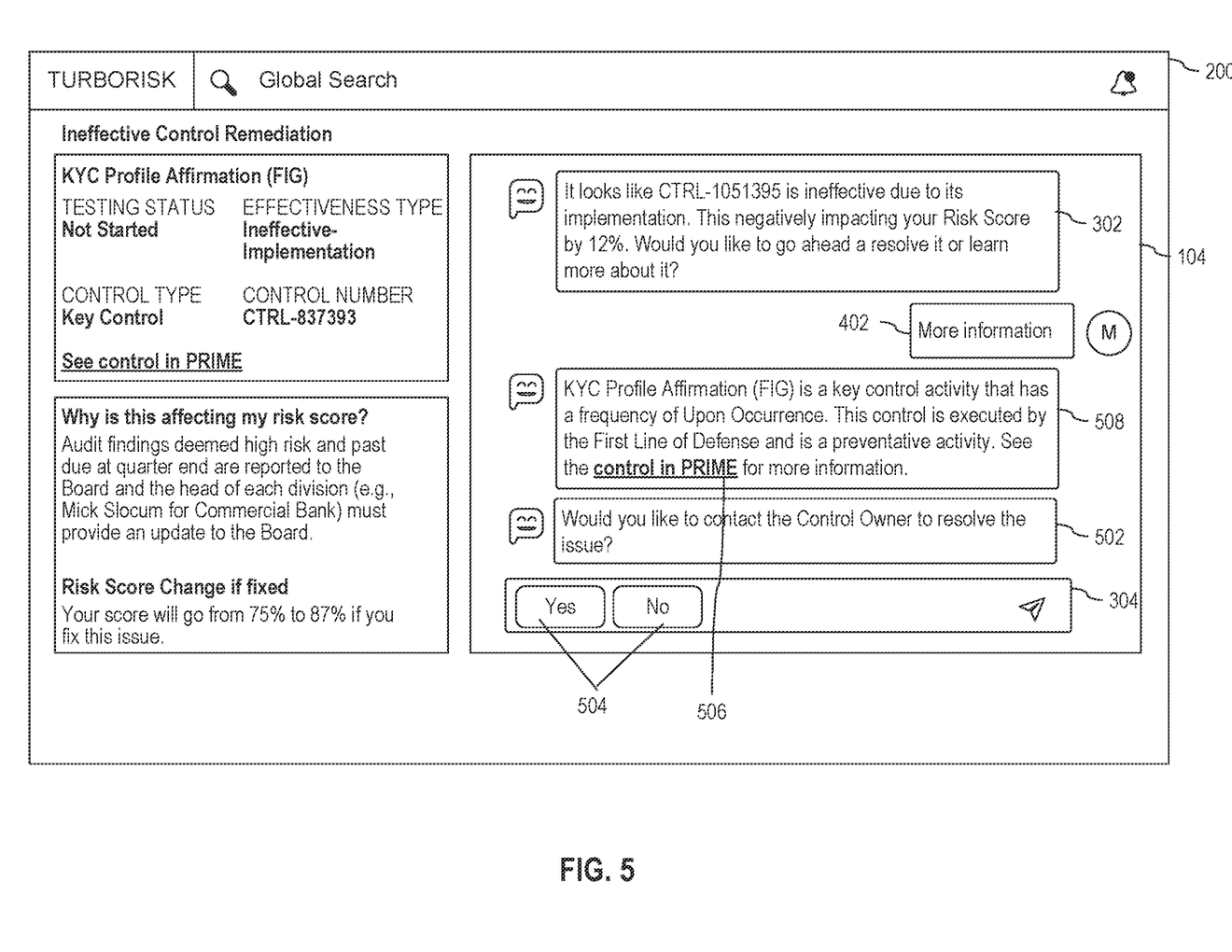

FIG. 5 shows the chatbot 104 displaying an acknowledgment 508 and a follow up question 502. The acknowledgment 508 and the follow up question 502 are generated and displayed based on the user's typed inquiry 402. FIG. 5 shows an example where the acknowledgment 508 indicates that the ineffective control relates to a "know your customer" (KYC) profile related issue (related to a data protection regulation, rule, or policy), and asks the user whether he or she wants to contact a further individual to resolve issues related to the ineffective control. The follow up question 502 asks the user whether he or she would like to contact an individual in charge of the control to see if the issue can be resolved or at least to notify the individual in charge of the issue.

In aspects, the acknowledgment 508 can also provide a link 506 to a data source that can provide more information to the user regarding the issue. In aspects, as part of the follow up question 502, interactive buttons 504 can also be generated by the system 100 and displayed by the chatbot 104. The interactive buttons 504, when chosen by a user can provide a follow up answer to the follow up question 502. FIG. 5 shows the interactive buttons 504 as "yes" or "no" options that the user can interact with by clicking either of the interactive buttons 504. In FIG. 5, depending on which of the interactive buttons 504 is chosen, the owner of the control/individual in charge of the control can be contacted. In aspects, rather than being presented with interactive buttons 504, the system 100 can allow the user to type in the response. Thus, instead of interacting with the interactive buttons 504, the user can type in a "yes" or "no" response in the text box 304 as the follow up answer to the follow up question 502.

Figure 6:
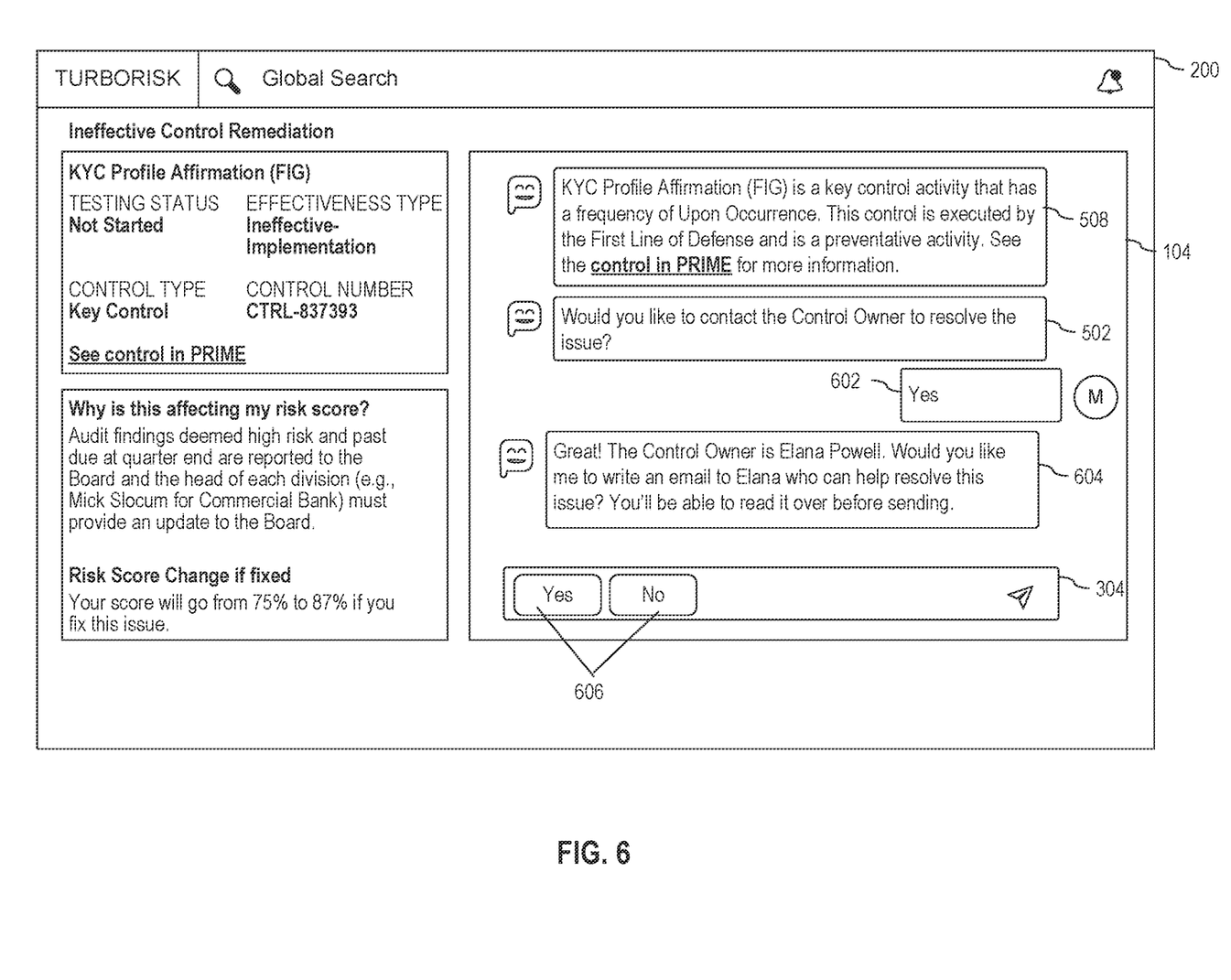

FIG. 6 shows the chatbot 104 generating a further follow up question 604 in response to the follow up answer 602 provided by the user. FIG. 6 shows the scenario where the user clicked on the "yes" interactive button of FIG. 5. In FIG. 6, the further follow up question 604 asks the user whether he or she would like to contact the control owner/individual in charge of the control. The system 100 can generate further interactive buttons 606 similar to what was described with respect to the interactive buttons 504 giving the user an option to respond to the further follow up question 604. Alternatively, and similar to what was described with respect to FIG. 5, the user can type in the response to the further follow up question 604. The response, either by choosing the further interactive buttons 606 or by typing in the response, can constitute a further answer to the further follow up question.

Figure 7:
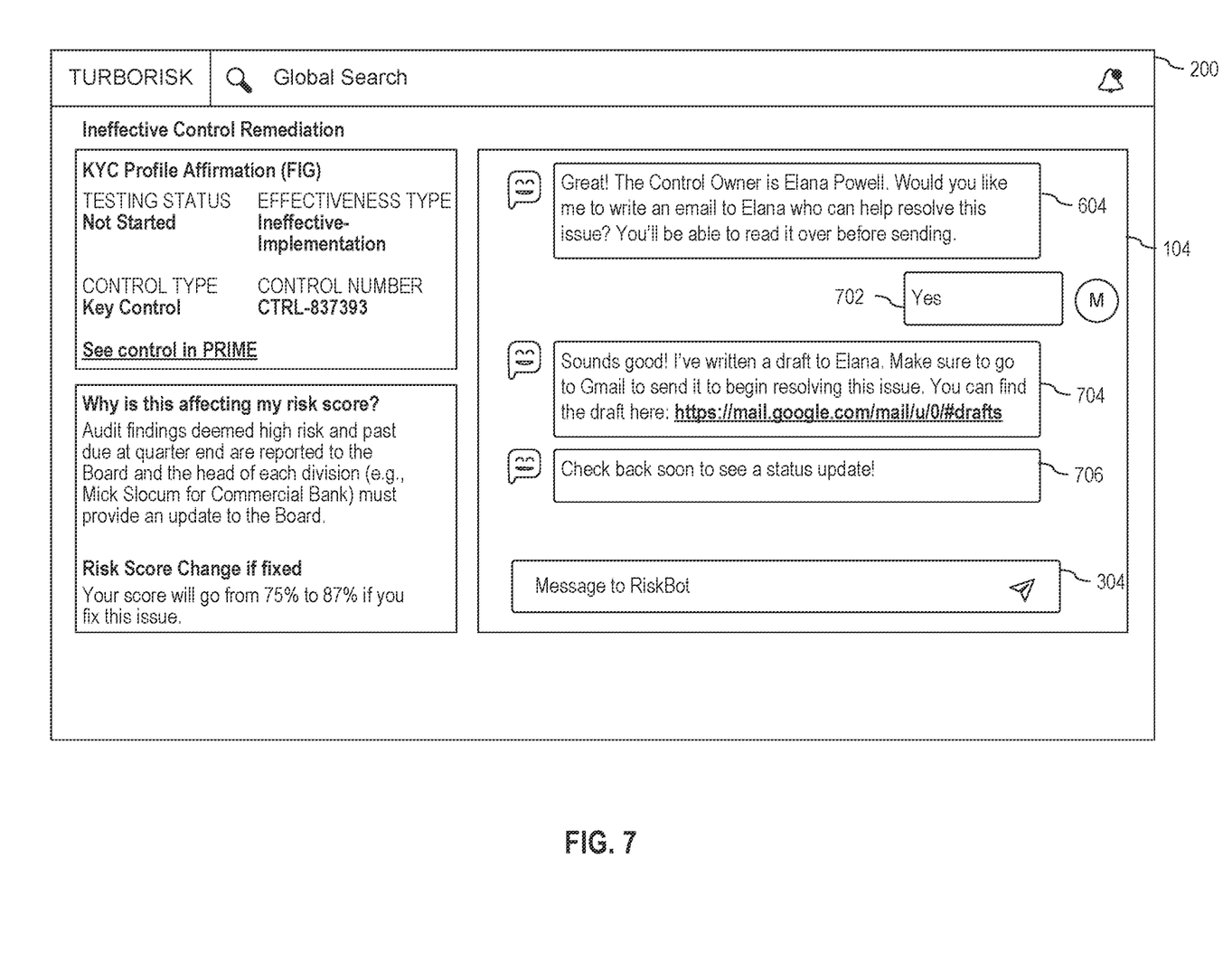

FIG. 7 shows the scenario where the user clicked the "yes" interactive button of FIG. 6 to contact the control owner/individual in charge of the control. In FIG. 7, in response to the user indicating that he or she wants to contact the control owner/individual in charge of the control, the system 100 can take actions to contact the control owner/individual in charge of the control. In aspects, and as shown in FIG. 7, this can be by having further components generate an email contacting the individual. In aspects, and as shown in FIG. 7, the system can generate outputs 704 and 706 indicating that a message was drafted for the individual. The outputs 704 and 706 can be displayed by the chatbot 104. In aspects, generation of the outputs 704 and 706 can constitute the termination condition that can terminate the interaction between the user and the chatbot 104.

The modules and interfaces described in FIGS. 1-7 may be implemented as or with instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

The system 100 described provides benefits in that it recognizes when a user is involved in a process that may invoke risk/compliance-related activity, and timely provides subject-matter specific prompts to a user to address any non-compliance related issues. For example, if the system 100 is integrated into a software application that monitors risk or compliance issues for a particular topic or area (e.g., financial auditing software), and if the software application determines there is an issue related to compliance, it can present a button or icon to the user. User interaction with the button or icon can prompt a chatbot interface to pop-up and alert the user of the issue. The system 100 also allows the user to make an inquiry related to the compliance issue. In this way, compliance related issues can be actively monitored and brought to the attention of those needing to know of any potential non-compliance related issues.

The system 100 described provides benefits in that it allows users to ask questions/make inquiries regarding risk and compliance related topics and have those questions answered without the user having to parse through legal, regulatory, or policy documents. The system 100 can also do this in a context specific manner, by recognizing the intent of the user inquiry using NLP techniques. Thus, the system 100 provides a way for computers to use NLP techniques to efficiently match the intent of a user's question to risk related topics, and to generate answers to those questions. Thus, the system 100 improves a computer's ability to understand the meaning behind user generated questions. This improves the intelligence of computers and enhances computer human interactions. The system 100 can also provide answers to user questions in real-time thus alerting users to any non-compliance issues immediately and allowing users to address those issues.

Methods of Operation

Figure 8:
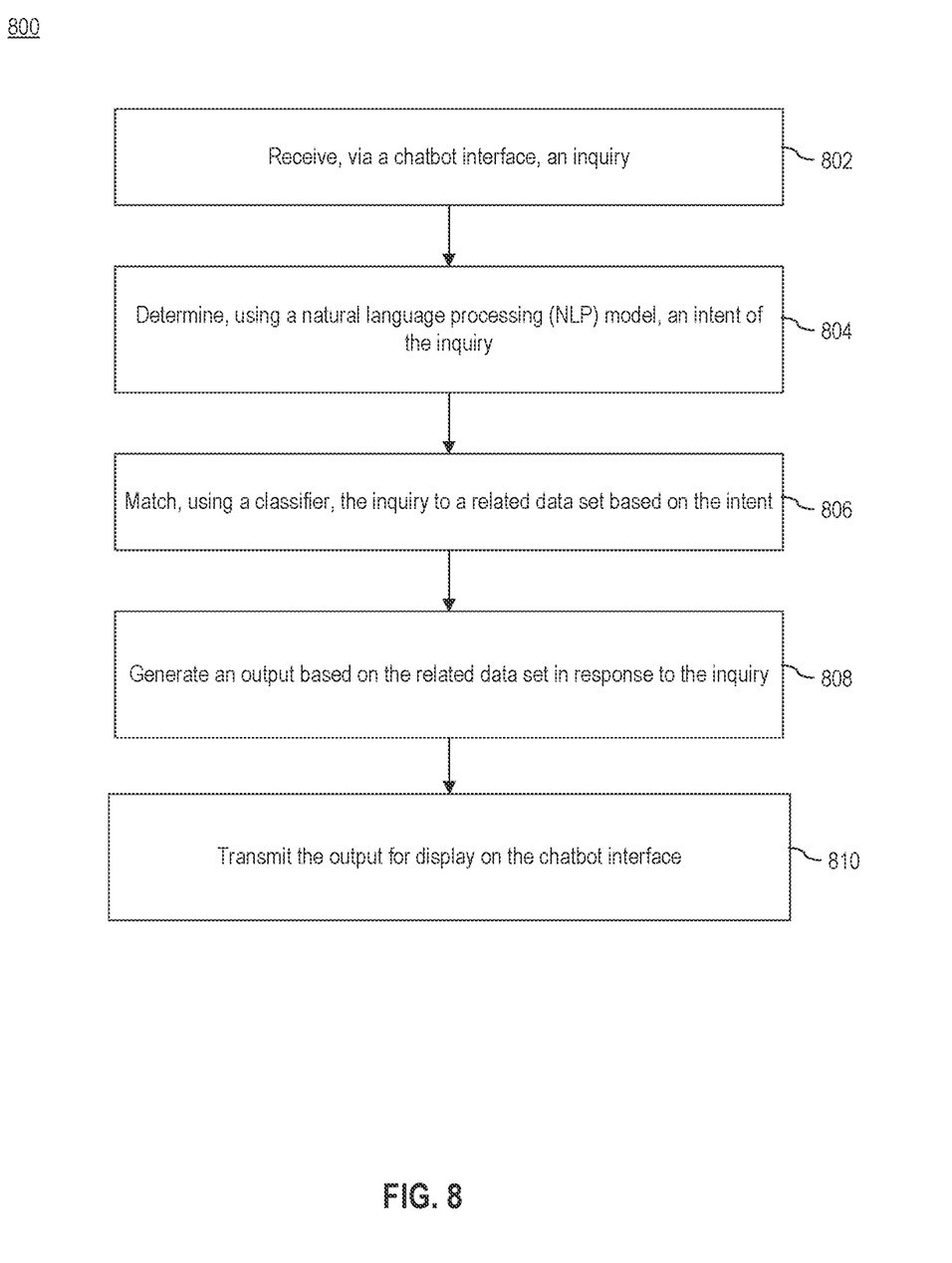
FIG. 8 is an example method of operating the system, according to aspects of the disclosure.

FIG. 8 is an example method 800 of operating the system 100, according to aspects of the disclosure. Method 800 may be performed as a series of steps by a computing unit such as a processor. At step 802, method 800 can include receiving, via a chatbot's 104 interface, an inquiry 106. At step 804, an intent of the inquiry 106 can be determined using a NLP model 110. At step 806, the inquiry 106 can be matched to a related data set (e.g., data sources 114 or risk data sources 116a, 116b, and/or 116c) using a classifier 112 based on the determined intent. At step 808, an output can be generated based on the related data set in response to the inquiry 106. At step 810, the output can be transmitted to a chatbot's 104 interface for display. The operation of method 800 can be performed, for example, by system 100, in accordance with aspects described above.

Components of the System

Figure 9:
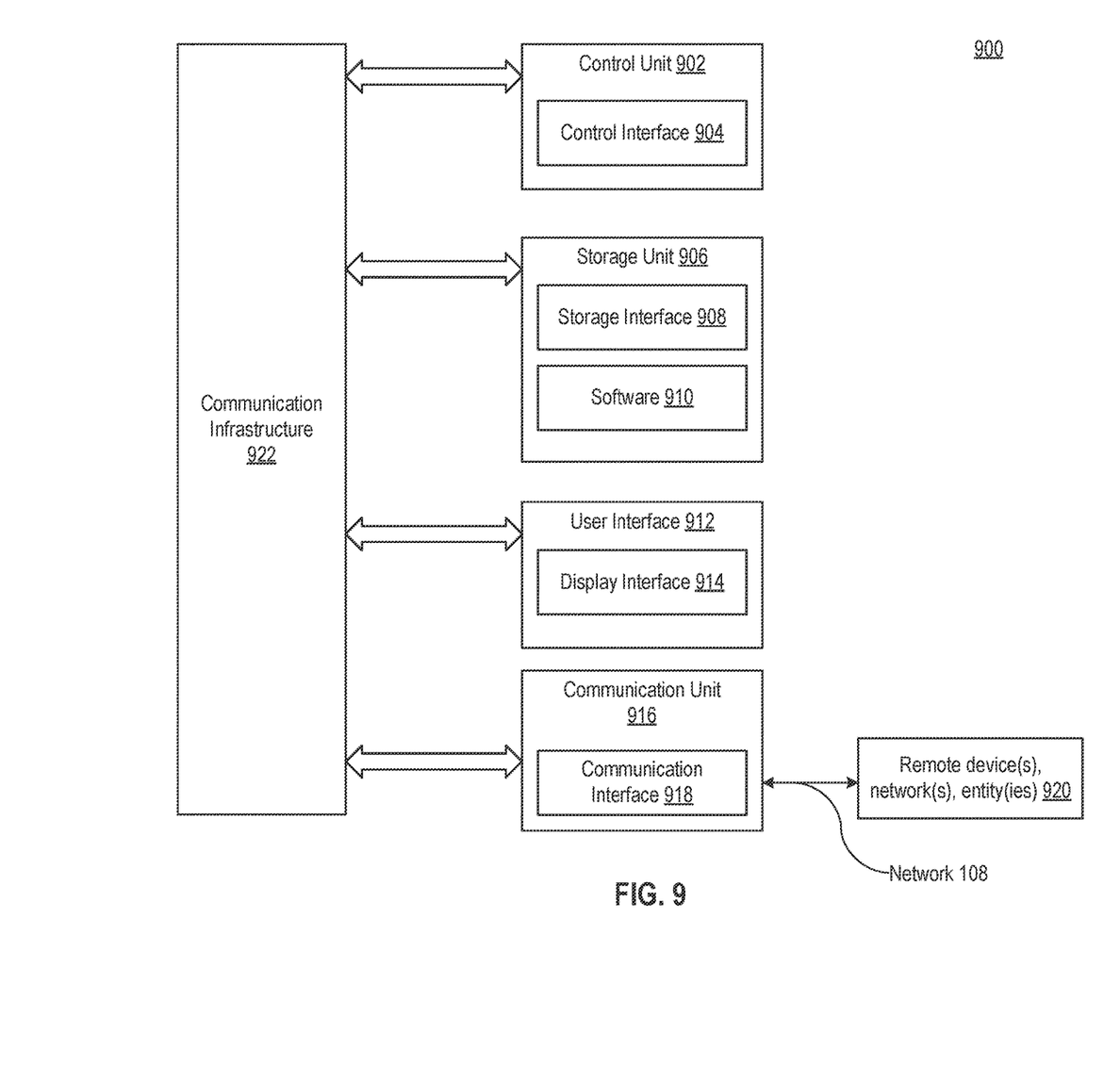
FIG. 9 is an example architecture of components for devices that may be used to implement the system, according to aspects of the disclosure.

FIG. 9 is an example architecture 900 of components for devices that may be used to implement the system 100, according to aspects of the disclosure. The components may be the components of the server 124 or the client device 102. In aspects, the components may include a control unit 902, a storage unit 906, a communication unit 916, and a user interface 912. The control unit 902 may include a control interface 904. The control unit 902 may execute a software 910 to provide some or all of the intelligence of system 100. The control unit 902 may be implemented in a number of different ways. For example, the control unit 902 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 904 may be used for communication between the control unit 902 and other functional units or devices of system 100. The control interface 904 may also be used for communication that is external to the functional units or devices of system 100. The control interface 904 may receive information from the functional units or devices of system 100, or from remote devices 920, such as the user database 118 and/or the data sources 114, or may transmit information to the functional units or devices of system 100, or to remote devices 920. The remote devices 920 refer to units or devices external to system 100.

The control interface 904 may be implemented in different ways and may include different implementations depending on which functional units or devices of system 100 or remote devices 920 are being interfaced with the control unit 902. For example, the control interface 904 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 904 may be connected to a communication infrastructure 922, such as a bus, to interface with the functional units or devices of system 100 or remote devices 920.

The storage unit 906 may store the software 910. For illustrative purposes, the storage unit 906 is shown as a single element, although it is understood that the storage unit 906 may be a distribution of storage elements. Also for illustrative purposes, the storage unit 906 is shown as a single hierarchy storage system, although it is understood that the storage unit 906 may be in a different configuration. For example, the storage unit 906 may be formed with different storage technologies forming a memory hierarchical system including different levels of caching, main memory, rotating media, or off-line storage. The storage unit 906 may be a volatile memory, a nonvolatile memory, an internal memory, an external memory, or a combination thereof. For example, the storage unit 906 may be a nonvolatile storage such as nonvolatile random access memory (NVRAM), Flash memory, disk storage, or a volatile storage such as static random access memory (SRAM) or dynamic random access memory (DRAM).

The storage unit 906 may include a storage interface 908. The storage interface 908 may be used for communication between the storage unit 906 and other functional units or devices of system 100. The storage interface 908 may also be used for communication that is external to system 100. The storage interface 908 may receive information from the other functional units or devices of system 100 or from remote devices 920, or may transmit information to the other functional units or devices of system 100 or to remote devices 920. The storage interface 908 may include different implementations depending on which functional units or devices of system 100 or remote devices 920 are being interfaced with the storage unit 906. The storage interface 908 may be implemented with technologies and techniques similar to the implementation of the control interface 904.

The communication unit 916 may enable communication to devices, components, modules, or units of system 100 or to remote devices 920. For example, the communication unit 916 may permit the system 100 to communicate between the server 124 and the client device 102. The communication unit 916 may further permit the devices of system 100 to communicate with remote devices 920 such as an attachment, a peripheral device, or a combination thereof through the network 108.

As previously indicated with respect to FIG. 1, the network 108 may span and represent a variety of networks and network topologies. For example, the network 108 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 may traverse a number of network topologies and distances. For example, the network 108 may include direct connection, personal area network (PAN), local area network (LAN), metropolitan area network (MAN), wide area network (WAN), or a combination thereof.

The communication unit 916 may also function as a communication hub allowing system 100 to function as part of the network 108 and not be limited to be an end point or terminal unit to the network 108. The communication unit 916 may include active and passive components, such as microelectronics or an antenna, for interaction with the network 108.

The communication unit 916 may include a communication interface 918. The communication interface 918 may be used for communication between the communication unit 916 and other functional units or devices of system 100 or to remote devices 920. The communication interface 918 may receive information from the other functional units or devices of system 100, or from remote devices 920, or may transmit information to the other functional units or devices of the system 100 or to remote devices 920. The communication interface 918 may include different implementations depending on which functional units or devices are being interfaced with the communication unit 916. The communication interface 918 may be implemented with technologies and techniques similar to the implementation of the control interface 904.

The user interface 912 may present information generated by system 100. In aspects, the user interface 912 allows the users to interface with the system 100. The user interface 912 can allow users of the system 100 to interact with the system 100. The user interface 912 may include an input device and an output device. Examples of the input device of the user interface 912 may include a keypad, buttons, switches, touchpads, soft-keys, a keyboard, touchscreens, a mouse, or any combination thereof to provide data and communication inputs. Examples of the output device may include a display interface 914. The control unit 902 may operate the user interface 912 to present information generated by system 100. The control unit 902 may also execute the software 910 to present information generated by system 100, or to control other functional units of system 100. The display interface 914 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 800 and system 100 are cost-effective, highly versatile, and accurate, and may be implemented by adapting components for ready, efficient, and economical manufacturing, application, and utilization. Another important aspect of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method comprising:
    monitoring, by one or more computing devices and via a software application, a source of non-compliance related to an auditing rule;
    automatically launching, by the one or more computing devices, a chatbot interface with an alert indicating the source of non-compliance;
    receiving, by the one or more computing devices and via the chatbot interface, an inquiry in response to the alert;
    determining, by the one or more computing devices and using a natural language processing (NLP) model, an intent of the inquiry;
    matching, by the one or more computing devices, the intent to a related data set based on mapping keywords in the inquiry to labels mapped to one or more related data sets;
    extracting, by the one or more computing devices, information from the related data set in response to the inquiry;
    generating, by the one or more computing devices, an output based on the information, wherein the output includes a prompt indicating whether to contact an owner of a control for the auditing rule;
    transmitting, by the one or more computing devices, the output for display on the chatbot interface; and
    contacting, by the one or more computing devices, the owner of the control to notify the owner of the control of the source of non-compliance based on an affirmative response to the prompt.

2. The method of claim 1, wherein generating the output is done in real-time from when the inquiry is received.

3. The method of claim 1, wherein the auditing rule relates to financial auditing.

4. The method of claim 1, wherein the prompt is in a form of an interactive button that when initiated contacts the owner of the control.

5. The method of claim 1, wherein contacting the owner of the control is via email.

6. The method of claim 1, further comprising terminating, by the one or more computing devices, interaction of the chatbot interface upon contacting the owner of the control.

7. The method of claim 1, further comprising:
generating, by the one or more computing devices, a further output indicating that owner of the control was contacted; and
displaying, by the one or more computing devices and via the chatbot interface, the further output.

8. A non-transitory computer readable medium including instructions stored thereon that when executed by one or more processors of a computing system, causes the computing system to perform operations comprising:
monitoring, via a software application, a source of non-compliance related to an auditing rule;
automatically launching a chatbot interface with an alert indicating the source of non-compliance;
receiving, via the chatbot interface, an inquiry in response to the alert;
determining, using a natural language processing (NLP) model, an intent of the inquiry;
matching the intent to a related data set based on mapping keywords in the inquiry to labels mapped to one or more related data sets;
generating an output based on the information, wherein the output includes a prompt indicating whether to contact an owner of a control for the auditing rule;
transmitting the output for display on the chatbot interface; and
contacting the owner of the control to notify the owner of the control of the source of non-compliance based on an affirmative response to the prompt.

9. The non-transitory computer readable medium of claim 8, wherein generating the output is done in real-time from when the inquiry is received.

10. The non-transitory computer readable medium of claim 8, wherein the auditing rule relates to financial auditing.

11. The non-transitory computer readable medium of claim 8, wherein the prompt is in a form of an interactive button that when initiated contacts the owner of the control.

12. The non-transitory computer readable medium of claim 8, wherein contacting the owner of the control is via email.

13. The non-transitory computer readable medium of claim 8, wherein the operations further comprise terminating interaction of the chatbot interface upon contacting the owner of the control.

14. The non-transitory computer readable medium of claim 8, wherein the operations further comprise:
generating a further output indicating that owner of the control was contacted; and
displaying, via the chatbot interface, the further output.

15. A computing system comprising:
a memory configured to store instructions;
one or more processors, coupled to the memory, configured to process the stored instructions to:
monitor, via a software application, a source of non-compliance related to an auditing rule,
automatically launch a chatbot interface with an alert indicating the source of non-compliance,
receive, via the chatbot interface, an inquiry in response to the alert,
determine, using a natural language processing (NLP) model, an intent of the inquiry,
match the intent to a related data set based on mapping keywords in the inquiry to labels mapped to one or more related data sets,
generate an output based on the information, wherein the output includes a prompt indicating whether to contact an owner of a control for the auditing rule; and
contact the owner of the control to notify the owner of the control of the source of non-compliance based on an affirmative response to the prompt.

16. The computing system of claim 15, wherein generating the output is done in real-time from when the inquiry is received.

17. The computing system of claim 15, wherein the auditing rule relates to financial auditing.

18. The computing system of claim 15, wherein the prompt is in a form of an interactive button that when initiated contacts the owner of the control.

19. The computing system of claim 15, wherein contacting the owner of the control is via email.

20. The computing system of claim 15, wherein the one or more processors are further configured to terminate interaction of the chatbot interface upon contacting the owner of the control.

\* \* \* \* \*